United States Patent
Kelly et al.

(10) Patent No.: US 10,228,740 B2
(45) Date of Patent: Mar. 12, 2019

(54) SENSOR DEVICE AND METHOD (71) Applicant: Intel Corporation, Santa Clara, CA (US)

(72) Inventors: Mark Kelly, Leixlip (IE); Keith Nolan, Mullingar (IE); Hugh M. Carr, Delgany (IE); Sean O'Byrne, Dublin (IE)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 14/749,183

(22) Filed: Jun. 24, 2015

(65) Prior Publication Data
US 2016/0378153 A1 Dec. 29, 2016

(51) Int. Cl.
G06F 13/42 (2006.01)
G06F 1/26 (2006.01)
G06F 13/40 (2006.01)

(52) U.S. Cl.
CPC .......... *G06F 1/266* (2013.01); *G06F 13/4022* (2013.01); *G06F 13/4282* (2013.01); *Y02D 10/14* (2018.01); *Y02D 10/151* (2018.01)

(58) Field of Classification Search
CPC . G06F 13/42; G06F 1/26; G06F 13/40; Y02D 10/14; Y02D 10/151
See application file for complete search history.

(56) References Cited

U.S. PATENT DOCUMENTS

| | | | |
|---|---|---|---|
| 6,456,946 B1* | 9/2002 | O'Gorman | H02P 29/0241 702/58 |
| 7,226,310 B1* | 6/2007 | Dickrell | H01R 31/005 439/214 |
| 7,903,809 B2* | 3/2011 | Karam | G06F 1/26 379/413 |
| 8,149,102 B1* | 4/2012 | Miller | H04W 4/006 340/506 |
| 2003/0009610 A1* | 1/2003 | Nolan | G05B 19/0423 710/72 |
| 2003/0201882 A1* | 10/2003 | Moore | B60C 23/0408 340/445 |
| 2004/0142602 A1* | 7/2004 | Kamei | H01R 9/2458 439/700 |
| 2007/0026107 A1* | 2/2007 | Wang | C12Q 1/04 426/55 |

(Continued)

FOREIGN PATENT DOCUMENTS

WO WO2013-151343 A1 10/2013

OTHER PUBLICATIONS

International Search Report and Written Opinion dated Aug. 9, 2016 for International Application No. PCT/US2016/030787, 19 pages.

*Primary Examiner* — Henry Tsai
*Assistant Examiner* — Christopher A Daley
(74) *Attorney, Agent, or Firm* — Schwabe, Williamson & Wyatt, P.C.

(57) ABSTRACT

In embodiments, apparatuses, methods and storage media (transitory and non-transitory) are described that include a plurality of sensor connectors to removably receive a corresponding plurality of sensors and a power management module to selectively provide power to sensor connector power terminals in response to power management signals from a sensor control module. Other embodiments may be described and/or claimed.

23 Claims, 4 Drawing Sheets (56) References Cited

U.S. PATENT DOCUMENTS

| | | | |
|---|---|---|---|
| 2007/0224461 A1* | 9/2007 | Oh | G06F 1/263 |
| | | | 429/9 |
| 2008/0150360 A1* | 6/2008 | Vezza | G01D 21/00 |
| | | | 307/31 |
| 2011/0071794 A1* | 3/2011 | Bronczyk | G01D 21/00 |
| | | | 702/188 |
| 2011/0077473 A1* | 3/2011 | Lisogurski | A61B 5/14551 |
| | | | 600/301 |
| 2012/0030388 A1* | 2/2012 | Bas | G06F 13/4027 |
| | | | 710/106 |
| 2014/0088780 A1* | 3/2014 | Chen | G05F 1/66 |
| | | | 700/295 |
| 2015/0369618 A1* | 12/2015 | Barnard | H05B 37/0272 |
| | | | 701/491 |
| 2016/0076951 A1* | 3/2016 | Sun | G01K 19/00 |
| | | | 702/99 |
| 2016/0161999 A1* | 6/2016 | Chen | G06F 1/1656 |
| | | | 713/300 |

* cited by examiner

SENSOR DEVICE AND METHOD

TECHNICAL FIELD

The present disclosure relates to the field of sensing devices, in particular, to sensor interface devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Sensors from multiple vendors or sources cannot typically be easily interfaced with processor platforms and may require programming of some level of abstraction interface. Existing sensing devices are typically hardwired to support a particular sensor type or range of sensors based on their physical characteristics, and power management of sensors is often limited to power management of the entire device. It is generally not easy to seamlessly and quickly remove and replace sensors in a sensor device when the sensors have exceeded their useful lifetime.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Figure 1:
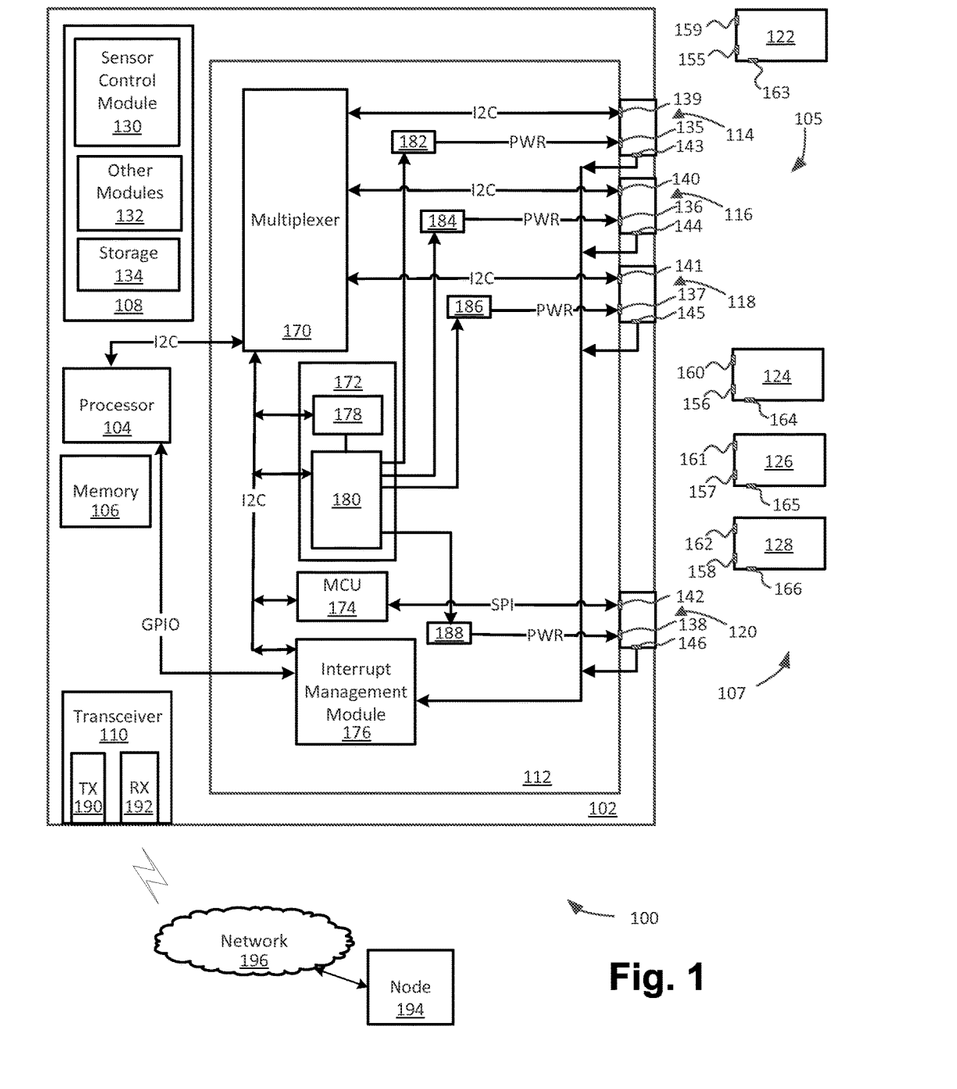
FIG. 1 is a block diagram of a sensor environment including a sensor device having sensor interface technology of the present disclosure, in accordance with various embodiments.

Referring now to FIG. 1, a sensor environment 100, including a sensor device 102 having sensor interface technology of the present disclosure, in accordance with various embodiments, is illustrated. In some embodiments, the sensor device 102 may be referred to as a sensor point. As shown, the sensor device 102 may include a number of components, including a processor 104; a system memory 106; an execution environment 108; a transceiver 110; and a sensor interface board 112. In some embodiments, the sensor device 102 may be or be included as a part of an Internet of Things (IoT) device such as an environmental monitoring device, a remote health monitoring device, an appliance, a lightbulb, or a thermostat, for example. The sensor device 102 may be or be included as a part of a mobile computing device or a wearable computing or sensing device in some embodiments. In various embodiments, the sensor interface board 112 may include a plurality of sensor connectors 105 to removably receive a corresponding plurality of sensors 107. In some embodiments, various components of the sensor device 102, that may include various components of the sensor interface board 112, may be coupled together and configured to cooperate with each other to selectively provide power to the sensor connectors 105, communicate with sensors coupled with the sensor connectors 105, or detect and respond to interrupts from sensors coupled with the sensor connectors 105. The sensor connectors 105 may be referred to as sensor slots or sensor ports in various embodiments. In embodiments, the processor 104 may be included in a system on a chip (SoC) such as an Intel® Quark™ device, for example.

In embodiments, the plurality of sensor connectors 105 may include a first sensor connector 114, a second sensor connector 116, a third sensor connector 118, and a fourth sensor connector 120. Although four sensor connectors are shown, there may be a greater or lesser number of sensor connectors 105 in various embodiments. The corresponding plurality of sensors 107 may include a first sensor 122, a second sensor 124, a third sensor 126, and a fourth sensor 128. In embodiments, some of the plurality of sensor connectors 105 may remain uncoupled with a sensor during operation of the sensor device 102. In embodiments, the execution environment 108 may include a sensor control module 130, other modules 132 and storage 134. In embodiments, the sensor control module 130 and the other modules 132 may be operated by the processor 104. In embodiments, the sensor interface board 112 may support a common physical sensor connection interface which allows rapid insertion and removal of sensors. In embodiments, the sensor connectors 105 of the sensor interface board 112 may be sensor slots having the same physical dimensions and attachments (e.g., power terminal, interrupt terminal, communication terminal).

In embodiments, the sensor control module 130 may be operated by the processor 104 to receive a sensor identifier from each sensor coupled with a sensor connector. The sensor identifier may be a unique identifier for each sensor that may enable identification and enumeration of sensors in various embodiments. The sensor identifier may be based on an extension to a Human Interface Device (HID) sensor class in some embodiments. The sensor identifier may allow identification of a particular sensor type, such as an environmental air quality sensor for collecting metric readings on carbon monoxide, nitric oxide, volatile organic compounds, or other factors; or a weather sensor such as a wind speed, humidity, temperature, or atmospheric pressure sensor, for example. The sensor control module 130 may detect the type of observations that each connected sensor supports based at least in part on the received sensor identifier.

In embodiments, the sensing device 102 may allow any sensor conforming to the common physical form factor of the sensor connectors 105 and that is configured to provide a sensor identifier to be interfaced with the sensor interface board 112. In embodiments, the sensor interface board 112 may support interfacing with sensors through both inter-integrated circuit (I2C) communication and serial peripheral interface (SPI) communication. In embodiments, sensors conforming to the common physical form factor may be plugged into any sensor connector of the sensor interface board 112, enabling arbitrary placement of any sensor. In some embodiments, dedicated I2C or SPI sensor connectors may be present, allowing I2C sensors to be coupled with the dedicated I2C sensor connectors and SPI sensors to be coupled with the dedicated SPI sensor connectors.

In embodiments, each sensor connector 114, 116, 118, and 120 may include a power terminal, a communication terminal, and an interrupt terminal. As shown, the sensor connectors 114, 116, 118, and 120 may include power terminals 135, 136, 137, and 138; communication terminals 139, 140, 141, and 142; and interrupt terminals 143, 144, 145, and 146, respectively. In various embodiments, each sensor may include a corresponding power terminal, a corresponding communication terminal, and a corresponding interrupt terminal. As shown, the sensors 122, 124, 126, and 128 may include power terminals 155, 156, 157, and 158; communication terminals 159, 160, 161, and 162; and interrupt terminals 163, 164, 165, and 166, respectively, that may be located such that they will be coupled with a corresponding power terminal, communication terminal, or interrupt terminal of a sensor connector when the sensor is coupled with the sensing device 102.

As shown, the sensor connectors 114, 116, and 118 may be I2C sensor connectors and sensor connector 120 may be an SPI sensor connector. The corresponding communication terminals 139, 140, and 141 may be I2C communication terminals and the communication terminal 142 may be an SPI communication terminal in various embodiments. Although the power terminals, communication terminals, and interrupt terminals of the sensor connectors 105 and sensors 107 are each shown as being a single terminal for clarity, one or more of the terminals may include multiple connections (e.g., a positive voltage and ground for each power terminal or three communication lines for each communication terminal).

In embodiments, a multiplexer 170 may be coupled with the processor 104 and the communication terminals 159, 160, 161, and 162. The multiplexer 170 may also be coupled with a power management module 172, a micro controller unit 174, and an interrupt management module 176, in various embodiments. In embodiments, the interrupt management module 176 may also be coupled with the processor 104 over a general purpose I/O (GPIO) line. In embodiments, the power management module 172 may include an input output (I/O) expander module 178 and a power control switch 180, both of which may be coupled with the multiplexer 170. In embodiments, the I/O expander module 178 may be coupled with the power control switch 180 using a control pin. The power control switch 180 may be coupled with each of the sensor connectors 114, 116, 118, and 120 at the power terminals 135, 136, 137, and 138 to dynamically power up or power down sensors coupled with the sensor connectors 114, 116, 118, and 120 in various embodiments. In embodiments, the power control switch 180 may be coupled with the processor 104 via the I/O expander module 178.

As shown, communication terminals 139, 140, and 141 may be coupled with the multiplexer 170 and may communicate using I2C while communication terminal 142 may be coupled with the MCU and may communicate using SPI. In various embodiments, sensor connectors of the sensing device 102 may be coupled with different numbers of I2C or SPI communication lines, including all I2C or all SPI in some embodiments. In some embodiments, the sensing device 102 may be referred to as a sensing apparatus. Although each sensor connector 114, 116, 118, and 120 is shown having a communication terminal coupled with either an I2C or an SPI communication line for clarity, in some embodiments, each sensor connector may include both an I2C communication terminal that may be coupled with the multiplexer 170 and an SPI communication terminal that may be coupled with the MCU 174. In embodiments, each sensor may have at least one communication terminal that may be located such that it will be coupled with a corresponding communication terminal of a sensor connector when the sensor is coupled with the sensing device 102. In embodiments, each sensor may have an I2C communication terminal, an SPI communication terminal, or both I2C and SPI communication terminals.

The micro controller unit 174 may handle communications with SPI sensors and handle interrupts from the interrupt management module 176 in various embodiments.

In embodiments, the micro controller unit 174 may include an SPI to I2C conversion module that may allow the sensor control module 130 to communicate using I2C with an SPI sensor coupled with the sensor connector 120. The MCU 174 may include an MCU memory (not shown), an operating environment (not shown), storage (not shown), and sensor interface board control modules (not shown) operated by the MCU 174 in various embodiments. In embodiments, the sensor interface board control modules may be operated by the MCU 174 to perform some of the functions described with respect to the sensor control module 130 or the other modules 132. In some embodiments, the sensor device 102 may include a separate SPI to I2C converter (not shown) to convert SPI signals from SPI based sensors to I2C format. In embodiments, one or more of the sensor connectors 114, 116, 118, or 120 may be configured to be coupled with actuators in addition to sensors and the other modules 132 may be operated by the processor 104 to control actuators coupled with the sensor device 102. In some embodiments, one or more components, such as the MCU 174, may not be present in the sensing device 102. In embodiments where the MCU 174 may not be present, the other modules 132 may be operated by the processor 104 to perform one or more of the functions described with respect to the MCU 174.

In embodiments, the multiplexer 170 may be an I2C multiplexer that may selectively connect the processor 104 to: one or more of the communication terminals 159, 160, 161, and 162 to selectively allow I2C communication between the sensor control module 130 and each communication terminal to which the multiplexer 170 is coupled; the power management module 172; the MCU 174; or the interrupt management module 176. In embodiments, the multiplexer 170 may also function as an I2C expander. In various embodiments, the multiplexer 170 may be a multiplexer capable of handling both I2C and SPI signals. In some embodiments, the multiplexer 170 may be an SPI multiplexer. The interrupt management module 176 may include an I/O expander module in various embodiments. The interrupt management module 176 may be coupled with the interrupt terminals 143, 144, 145, and 146 and be configured to receive and detect interrupts and associate them with a particular address or address range corresponding to the sensor connector 114, 116, 118, or 120 associated with the interrupt terminal 143, 144, 145, or 146 from which the received interrupt originated.

In embodiments, a first power switch 182 may be coupled with the power control switch 180 of the power management module 172 and the power terminal 135 of the first sensor connector 114; a second power switch 184 may be coupled with the power control switch 180 and the power terminal 136 of the second sensor connector 116; a third power switch 186 may be coupled with the power control switch 180 and the power terminal 137 of the third sensor connector 118; and a fourth power switch 188 may be coupled with the power control switch 180 and the power terminal 138 of the fourth sensor connector 120. In embodiments, the power switches 182, 184, 186, and 188 may be coupled with a voltage source, not shown for clarity, and may selectively provide power to the power terminals 135, 136, 137, and 138 based at least in part on signals received from the power control switch 180 of the power management module 172 that may be in response to power management signals from the sensor control module 130.

The transceiver 110 may include a transmitter 190 and a receiver 192 in various embodiments. The transceiver 110 may be configured to communicate using one or more wireless communication methods and topologies such as IEEE 802.11x (WiFi), Bluetooth, IEEE 802.15.4, wireless mesh networking, wireless personal/local/metropolitan area network technologies, or wireless cellular communication using a radio access network that may include a Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE) network, GSM Enhanced Data rates for GSM Evolution (EDGE) Radio Access Network (GERAN), Universal Terrestrial Radio Access Network (UTRAN), Evolved UTRAN (E-UTRAN), IEEE 802.22, IEEE 802.11af, IEEE 802.11ac, LoRa™, or SigFox. In embodiments, the sensor device 102 may be in data communication with a node 194, over a network 196. The node 194 may be a computing node including one or more servers. In embodiments, one or more sensor devices 102 may be deployed in a small or large scale wired or wireless sense and actuate network deployment across local or geographically dispersed locations. In an example application, multiple sensor devices 102 may be deployed in a city as a part of an environmental monitoring network. In embodiments, sensor data may be forwarded to the node 194 or the sensor control module 130 or other modules 132 may provide other data to the node 194 or receive data from the node 194 and control the sensing device 102 based at least in part on the received data. In embodiments, the sensor device 102 may communicate using wired communications instead of or in addition to wireless communications.

The storage 134 may include a database to store received sensor data or sensor characteristics in various embodiments. The other modules 132 may include security modules to control access or control of the sensor device 102 and communication modules to conduct communications with other devices such as the node 194. In embodiments, analog sensors may include an analog to digital converter (ADC) with an I2C or SPI interface to convert analog sensor data to a digital signal in an I2C or SPI format. In some embodiments, one or more of the sensor connectors may include an analog terminal (not shown) to receive an analog signal from a connected analog sensor, and the sensor device 102 may also include an ADC with an I2C interface (not shown), coupled with the analog terminal and the multiplexer 170 to convert analog sensor data to a digital signal in I2C format and allow the sensor device 102 to function with analog sensors that do not include an ADC as a part of the sensor.

In embodiments, the sensor device 102 may be a warm pluggable system that allows some components such as the processor 104, operating environment 108, the power management module 172, the MCU 174, and the interrupt management module 176 to operate normally while sensors are added or replaced by coupling them with or uncoupling them with the sensor connectors 114, 116, 118, or 120. In embodiments, the sensor device 102 may provide per sensor power management that supports attachment and removal of sensors to the sensor connectors 114, 116, 118 or 120 while the sensor device 102 is in operation. In embodiments, sensors may be added or removed from any of the sensor connectors 114, 116, 118, or 120 that may be configured as slots having a common form factor. Sensors coupled with the sensor device 102 that are not being added or replaced may continue to operate normally while other sensors are being added or replaced in various embodiments.

In various embodiments, the interrupt management module 176 of the sensor device 102 may be configured to provide interrupt management which may also be referred to as side band signaling, allowing the sensor device 102, on detecting an interrupt from a sensor, to ascertain which sensor connector, and thus which sensor, the interrupt pertains to. In embodiments, the side band signaling may be used to indicate which sensors are present or in a power on state which, coupled with per sensor power management (which may enable the sensor device 102 to support the attachment and removal of sensors while the sensor device 102 is in operation) and the common physical sensor connection interface (which may allow sensors to be attached to or removed from any one of N sensor connectors of the sensor interface board 112), may allow the sensor device 102 to detect that a sensor has been added or removed. In embodiments, an interrupt line coupled with the interrupt terminals 143, 144, 145, and 146 may act as a side band signaling channel to enable interrupt driven sensor reading rather than or in addition to polling the sensors. In embodiments, this may allow for more efficient operation of the sensor device 102 because data may be read from a sensor only when an interrupt flags that data is available, eliminating the need for sensor polling and the signaling overhead entailed. In embodiments, interrupts may be exposed to the processor 104 via I2C. In various embodiments, interrupts may signal when a sensor observation is ready for reading, a sensor status, a sensor error, or other sensor attributes. In embodiments, other modules 132 may be operated by the processor 104 to perform some functions described with respect to the interrupt management module 176.

The sensor device 102 may detect a state change manifested by an interrupt which corresponds to a particular sensor connector 114, 116, 118, or 120, and thus a particular sensor coupled with the sensor connector. Such state changes may result from, for example, a new device being plugged into a sensor connector, powered on, or removed from a sensor connector. In some embodiments, a sensor status interrupt signaling a new connection may be sent when a sensor is newly connected to a sensor connector. After a newly connected sensor is powered on, the sensor may periodically send a sensor status interrupt signaling that the sensor is present and in a power-on state. When such a sensor is removed, the sensor status interrupt will no longer be available to the interrupt management module 176, the MCU 174, or the sensor control module 130 operated by the processor 104 and may allow the sensor device 102 to determine that the sensor has been removed based at least in part on ceasing to receive the sensor status interrupt. In embodiments, if a sensor is powered down because it is determined to be a redundant sensor or is powered down or put in standby mode for another reason, a sensor status interrupt may be periodically sent indicating such a powered down or standby sensor status. When such a sensor is removed, the sensor status interrupt will no longer be available, and the sensor device 102 may determine that the sensor has been removed based at least in part on ceasing to receive the sensor status interrupt.

In embodiments, the sensor device 102 may support having two or more sensors of the same type, with one powered on and the others in a standby or powered off mode. When the active sensor fails, the sensor device 102 may have a fast switchover to one of the other redundant sensors. In embodiments, the sensor device 102 may support a per sensor duty cycle approach (e.g., fine grained power control of sensors). The power management module 172 of the sensor interface board 112 may be configured to duty cycle sensors by switching on or off power terminals 135, 136, 137, or 138 of individual sensor connectors 114, 116, 118, or 120. This may allow, for example, a temperature sensor which only takes a temperature reading every few hours to be powered down when the sensor device 102 receives such a reading. The sensor can then be pre-emptively powered up and switched on in time for the next sensor reading, with a configurable sensor warming up period, prior to the sensor reading, also taken into account in some embodiments.

In embodiments, the power management module 172 may manage multiple different duty cycle and power management profiles tailored for particular sensors that may be based at least in part on sensor vendor, sensor type, or other characteristics. In some embodiments, the power management module 172 may selectively provide power to the sensor connector power terminals 135, 136, 137, or 138 based at least in part on duty cycle profiles and/or power management profiles corresponding to a sensor vendor, sensor type, or other characteristic that may be associated with sensor identifiers received by the sensor device 102 from sensors coupled with the sensor connector power terminals. In some embodiments, the duty cycle and/or power management profiles may be stored in the power management module 172. The duty cycle and/or power management profiles may be stored in another module or component of the sensor device 102 in some embodiments and may be updated in various embodiments. In embodiments, if a sensor deteriorates or starts to go outside of normal operational characteristics, the power management module 172 may power the sensor down to decommission it. In various embodiments, the power management module 172 may attempt to power the sensor back up again for a cold reset. In embodiments, the power management module 172 may act as a power regulator that may cut power to a particular sensor connector (e.g., a battery powered sensor device 102 could prioritize those sensors that should remain active while decommissioning others). In embodiments, the power management features of the sensor device 102 may contribute to energy efficiency improvements and have attendant cost savings, particularly for large scale network deployments with large numbers of sensors.

In embodiments, the sensor device 102 may support reading in arbitrary order from sensors coupled with one or more of the sensor connectors 114, 116, 118, or 120. In embodiments, communication with the sensors may be configurable and may allow for a higher frequency of readings from a particular sensor than other available sensors, for example. In embodiments, the sensor device 102 may support SPI and I2C communication between the sensor connectors and the processor 104. By supporting SPI and I2C, the sensor device 102 may support many different SPI and I2C compatible slave devices. For example, with I2C, using a 7 bit address range, up to 112 slave devices may be directly supported in some embodiments, with further sensors or other devices supported by daisy chaining them off of a sensor address which may facilitate increased range and scale of deployment scenarios in various embodiments. A single sensor connector address may itself host multiple slave devices. In some embodiments, a sensor connector, such as the sensor connector 114, 116, 118, or 120, may host, receive, and/or be coupled with a sensor connector expansion module that may be configured to host, receive, and/or be coupled with multiple sensors. In embodiments, sensors may appear as slave devices (over I2C) to the multiplexer 170 of the sensor interface board 112 and the sensor interface board 112 may appear as a slave device to the processor 104 which may be configured as a master device.

In embodiments, the sensor device 102 may support unique hardware configurable addresses for each sensor connector 114, 116, 118, and 120. In some embodiments, a four bit unique hardware configurable address may be used for each sensor connector 114, 116, 118, and 120. A sensor address may be dependent on the sensor connector 114, 116, 118, or 120 it is coupled with, allowing the sensor to plug and play by being coupled with different sensor connectors. By having a fixed address range for each sensor connector, extensive scanning of ports or address ranges to ascertain whether a sensor is active may be avoided in some embodiments, reducing the signal processing overhead of the sensor device 102. In embodiments, the upper four bits of an I2C address allocated to a sensor may be defined by the physical location that the sensor is coupled with and may define a particular sensor connector. This may allow multiple sensor types to have a common lower address range which may become a unique complete I2C address once the sensor is coupled with the sensing device 102. The four bit address space may be used to map each of the physical address points in some embodiments. Use of a smaller sensor address search space, combined with interrupt management, may enable the sensor device 102 to have less signaling overhead and improvements in data throughput and performance in various embodiments.

In embodiments, the sensor device 102 may provide sensor module housing, power to sensors, and interfaces for signal communication with sensors. The sensor device 102 may also provide capabilities that, in embodiments, may be hardware based, such as sensor multiplexing to manage one or more I2C connections, interrupt handling, and power management, in addition to reading data from connected sensors. In embodiments, the sensor device 102 may communicate with a Gateway or directly with a cloud infrastructure. The sensor device 102 may communicate via a wired connection using various protocols such as an RS485 connection, for example, or wirelessly using a variety of radio frequencies and protocols. In embodiments, the communication may include the sensor device 102 forwarding sensor data it has received from sensors to a cloud based gateway. In embodiments, the sensor device 102 may support communication with radio transceivers such as those based on IEEE 802.15.4.

Figure 2:
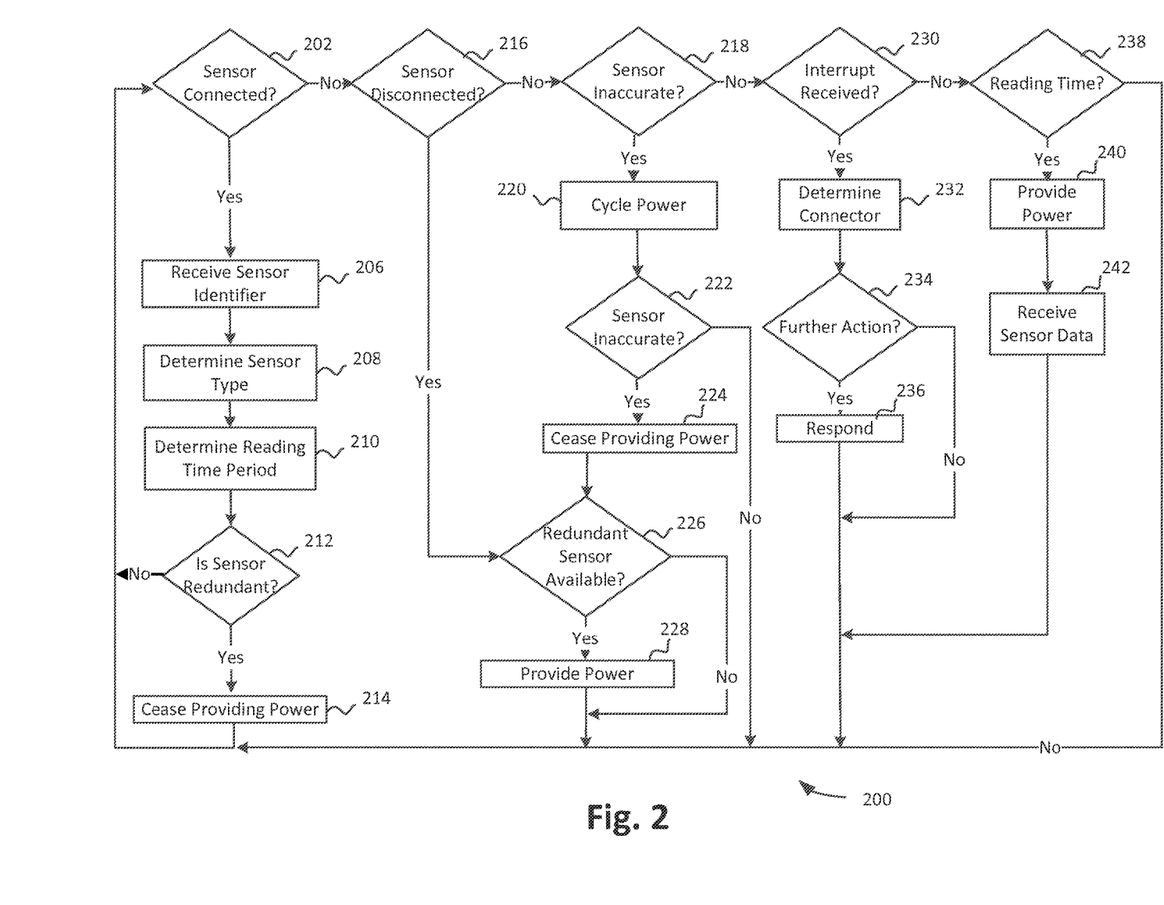
FIG. 2 is a flow diagram of an example process of sensing that may be implemented on a sensor device described herein, in accordance with various embodiments.

FIG. 2 is a flow diagram of an example process 200 of sensing that may be implemented on a sensor device described herein, in accordance with various embodiments. In various embodiments, some or all of the process 200 may be performed by sensor control module 130, other modules 132, the multiplexer 170, the power management module 172, the MCU 174, or the interrupt management module 176 of the sensor device 102 described with respect to FIG. 1. In other embodiments, the process 200 may be performed with more or less modules and/or with some operations in different order.

As shown, for embodiments, the process 200 may start at a decision block 202 where it may be determined whether a sensor has been newly connected to a sensor connector. In embodiments, it may be determined whether a sensor such as sensor 122, 124, 126, or 128 has been connected to sensor connector 114, 116, 118, or 120. In embodiments, it may be determined whether a sensor has been connected based at least in part on an interrupt received at the interruption management module 176.

If, at the decision block 202, it is determined a sensor has been newly connected to a sensor connector, the process 200 may proceed to a block 206 where a sensor identifier may be received from the connected sensor. In embodiments, if the second sensor 124 was connected to the first sensor connector 114, power may flow from the power terminal 135 to the power terminal 156 of the second sensor 124. The sensor control module 130 may receive the sensor identifier from the connected sensor, such as the second sensor 124. The sensor identifier may be included as data in a signal that may flow from the communication terminal 160 of the second sensor 124 to the communication terminal 139 over I2C by the multiplexer 170 selectively allowing the processor 104 to communicate with the communication terminal 139.

At a block 208, a sensor type may be determined by the sensor control module 130 based at least in part on the received sensor identifier. At a block 210, a reading time period may be determined by the sensor control module 130 based at least in part on the sensor type. In embodiments, the reading time period may vary according to sensor type. Some types of sensors may operate continuously, while others may take a reading on a periodic basis such as once per hour, twice per month, or every eight hours, for example. In embodiments, the reading time period may include a predefined sensor warm-up period and/or data transmission period.

The process 200 may proceed to a decision block 212 where it may be determined whether the connected sensor is redundant. In embodiments, the sensor may be determined to be redundant if another sensor of the same type or having the same sensor identifier is connected to another sensor connector of the sensor interface board 112. If, at the decision block 212, it is determined that the sensor is redundant, the sensor device 102 may cease to provide power to the sensor. If the sensor is determined to not be redundant, the process 200 may return to the decision block 202.

If, at the decision block 202, it is determined a sensor has not been newly connected, the process 200 may proceed to a decision block 216 where it may be determined whether a sensor has been recently disconnected. In embodiments, it may be determined that a sensor has been disconnected based at least in part on a periodic status interrupt signal no longer being received from a previously connected sensor.

If, at the decision block 216, it is determined a sensor has not been recently disconnected, the process 200 may proceed to a decision block 218 where it may be determined whether an operating sensor is inaccurate. In embodiments, the sensor device 102 may determine whether a sensor is inaccurate based at least in part on the most recent sensor data from each operating sensor. If the sensor data is outside of a predefined range, the sensor may be determined to be inaccurate (e.g., a temperature reading of 2000 degrees Celsius when a range of 5 to 100 degrees Celsius is expected). In embodiments, a sensor may alternatively or in addition be determined to be inaccurate based at least in part on an interrupt received from the sensor indicating an error has occurred.

If, at the decision block 218, it is determined a sensor is inaccurate, the process 200 may proceed to a block 220 where power to the power terminal of the sensor connector coupled with the inaccurate sensor may be cycled. In embodiments, the power may be cycled by ceasing to provide power to the power terminal for a predefined period of time, followed by providing power to the power terminal. The process 200 may then proceed to a decision block 222 where it may be determined whether the sensor to which power was cycled is still inaccurate. If, at the decision block 222, it is determined the sensor is still inaccurate, the process 200 may proceed to a block 224 where the sensor device 102 may cease to provide power to the power terminal of the sensor connector coupled with the inaccurate sensor. The process 200 may then proceed to a decision block 226, where it may be determined whether a redundant sensor is available. If, at the decision block 216, it is determined that a sensor has been disconnected, the process 200 may also proceed to the block 226 in some embodiments.

If, at the decision block 226, it is determined a redundant sensor is available, power may be provided by the sensor device 102 to a power terminal of a sensor connector coupled with the redundant sensor. The process 200 may then return to the decision block 202. If, at the decision block 226, it is determined that a redundant sensor is not available, the process 200 may also return to the decision block 202.

If, at the decision block 218, it is determined that there is not an inaccurate sensor, the process 200 may proceed to a decision block 230 where it may be determined whether an interrupt has been received. If, at the decision block 230, it is determined an interrupt has been received, the process 200 may proceed to a block 232 where a sensor connector associated with the interrupt may be determined. At a decision block 234, it may be determined whether any further action is needed based at least in part on the received interrupt. If, at the decision block 234, it is determined further action is needed, a response to the interrupt may be generated at the block 236. In various embodiments, the received interrupt may signal that data is available and the response at the block 236 may be to read the available data from the sensor that generated the interrupt. In some embodiments, if the interrupt is an error interrupt, a series of actions corresponding to those described with respect to the block 220, the decision block 222, the block 224, the decision block 226, and the block 228 may be performed. The process 200 may then return to the decision block 202. If, at the decision block 234, it is determined further action is not necessary, the process 200 may also return to the decision block 202.

If, at the decision block 230, it is determined an interrupt has not been received, the process 200 may proceed to a decision block 238 where it may be determined if it is reading time for a sensor. In embodiments, the reading time may be determined based at least in part on the reading time period determined at the block 210. If, at the decision block 238, it is determined that it is reading time for a sensor, the process 20 may proceed to a block 240 where power may be provided to the power terminal of the sensor connector coupled with the sensor having a current reading time. At a block 242, sensor data from the sensor may be received by the sensor control module 130 operated by the processor 104. The process 200 may return to the decision block 202. If, at the decision block 238, it is determined that it is not reading time for a sensor, the process 200 may return to the decision block 202. In some embodiments, sensor data readings may be interrupt-driven, rather than based on whether it is time for reading a sensor. Interrupts may also be used in combination with a determination of sensor reading time in some embodiments, with the sensor powered on before reading time followed by reading data from the powered on sensor based at least in part on receiving an interrupt from the sensor indicating that data is available to be read, which may be followed by powering down the sensor until it is time to power up for the next data read cycle.

Figure 3:
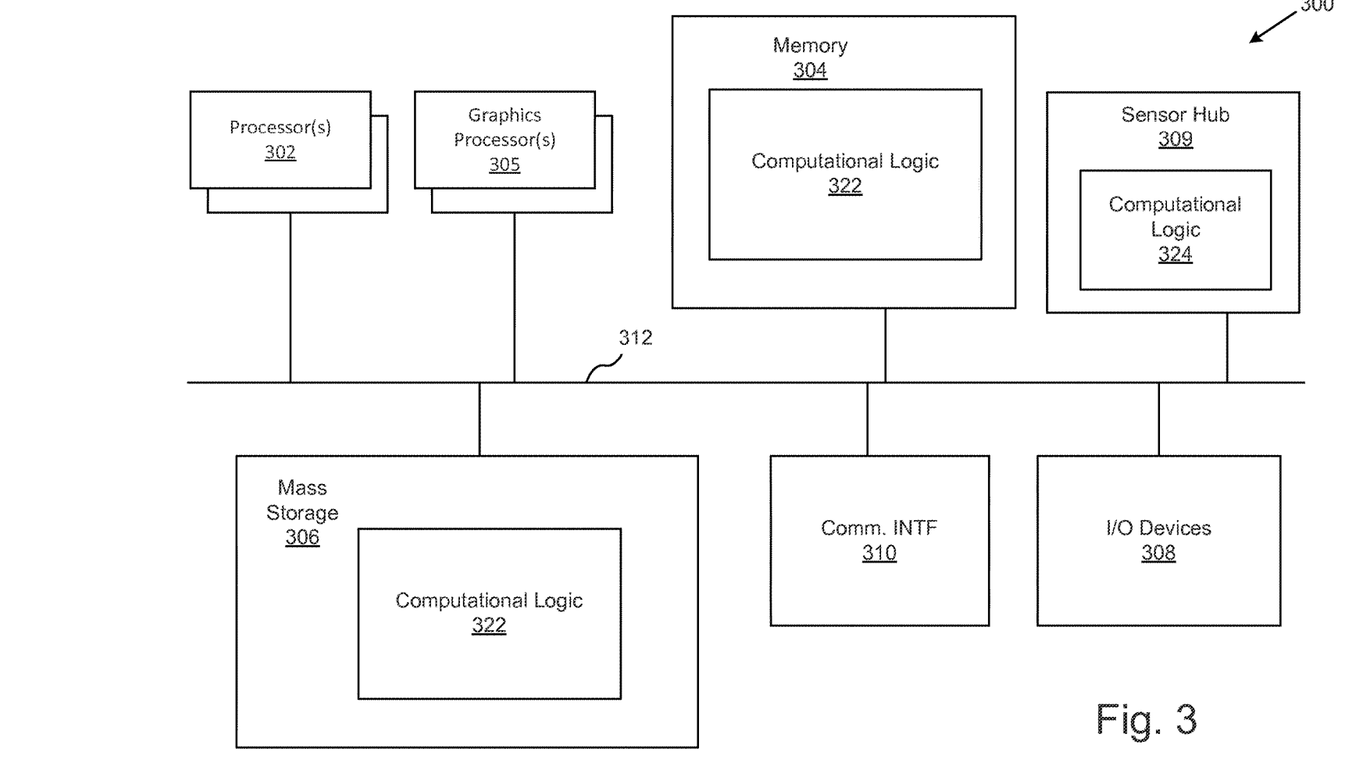
FIG. 3 illustrates an example computing environment suitable for practicing various aspects of the disclosure, in accordance with various embodiments.

Referring now to FIG. 3, an example computer 300 suitable to practice the present disclosure as earlier described with reference to FIGS. 1-2 is illustrated in accordance with various embodiments. As shown, computer 300 may include one or more processors or processor cores 302, and system memory 304. For the purpose of this application, including the claims, the term "processor" refers to a physical processor, and the terms "processor" and "processor cores" may be considered synonymous, unless the context clearly requires otherwise. Additionally, computer 300 may include one or more graphics processors 305, mass storage devices 306 (such as diskette, hard drive, compact disc read only memory (CD-ROM) and so forth), input/output devices 308 (such as display, keyboard, cursor control, remote control, gaming controller, image capture device, and so forth), sensor hub 309, and communication interfaces 310 (such as network interface cards, modems, infrared receivers, radio receivers (e.g., Bluetooth), and so forth). The elements may be coupled to each other via system bus 312, which may represent one or more buses. In the case of multiple buses, they may be bridged by one or more bus bridges (not shown). In embodiments, sensor hub 309 may be sensor device 102 of FIG. 1.

The communication interfaces 310 may include one or more communications chips that may enable wired and/or wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 310 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 310 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others. In various embodiments, the communication interfaces 310 may be configured to communicate using one or more wireless communication methods and topologies such as IEEE 802.11x (WiFi), Bluetooth, IEEE 802.15.4, wireless mesh networking, wireless personal/local/metropolitan area network technologies, or wireless cellular communication using a radio access network that may include a Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE) network, GSM Enhanced Data rates for GSM Evolution (EDGE) Radio Access Network (GERAN), Universal Terrestrial Radio Access Network (UTRAN), Evolved UTRAN (E-UTRAN), IEEE 802.22, IEEE 802.11af, IEEE 802.11 ac, LoRa™, or SigFox.

Each of these elements may perform its conventional functions known in the art. In particular, system memory 304 and mass storage devices 306 may be employed to store a working copy and a permanent copy of the programming instructions implementing an operating system and one or more applications, collectively denoted as computational logic 322. Similarly, sensor hub 309 may include programming instructions implementing the operations associated with the sensor device 102, e.g., operations described for sensor control module 130, other modules 132, power management module 172, MCU 174, and/or interrupt management module 176 shown and/or described with respect to FIG. 1, or operations shown in process 200 of FIG. 2, collectively denoted as computational logic 324. The system memory 304 and mass storage devices 306 may also be employed to store the data or local resources in various embodiments. The various programming instructions may be implemented by assembler instructions supported by processor(s) 302 or high-level languages, such as, for example, C, that can be compiled into such instructions.

The permanent copy of the programming instructions may be placed into mass storage devices 306 and/or sensor hub 309 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The number, capability and/or capacity of these elements 302-324 may vary, depending on whether computer 300 is a stationary computing device, such as a server, high performance computing node, set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 3 may be used. For example, some devices may not include the graphics processor 305, may use a unified memory that serves as both memory and storage, or may couple sensors without using a sensor hub.

Figure 4:
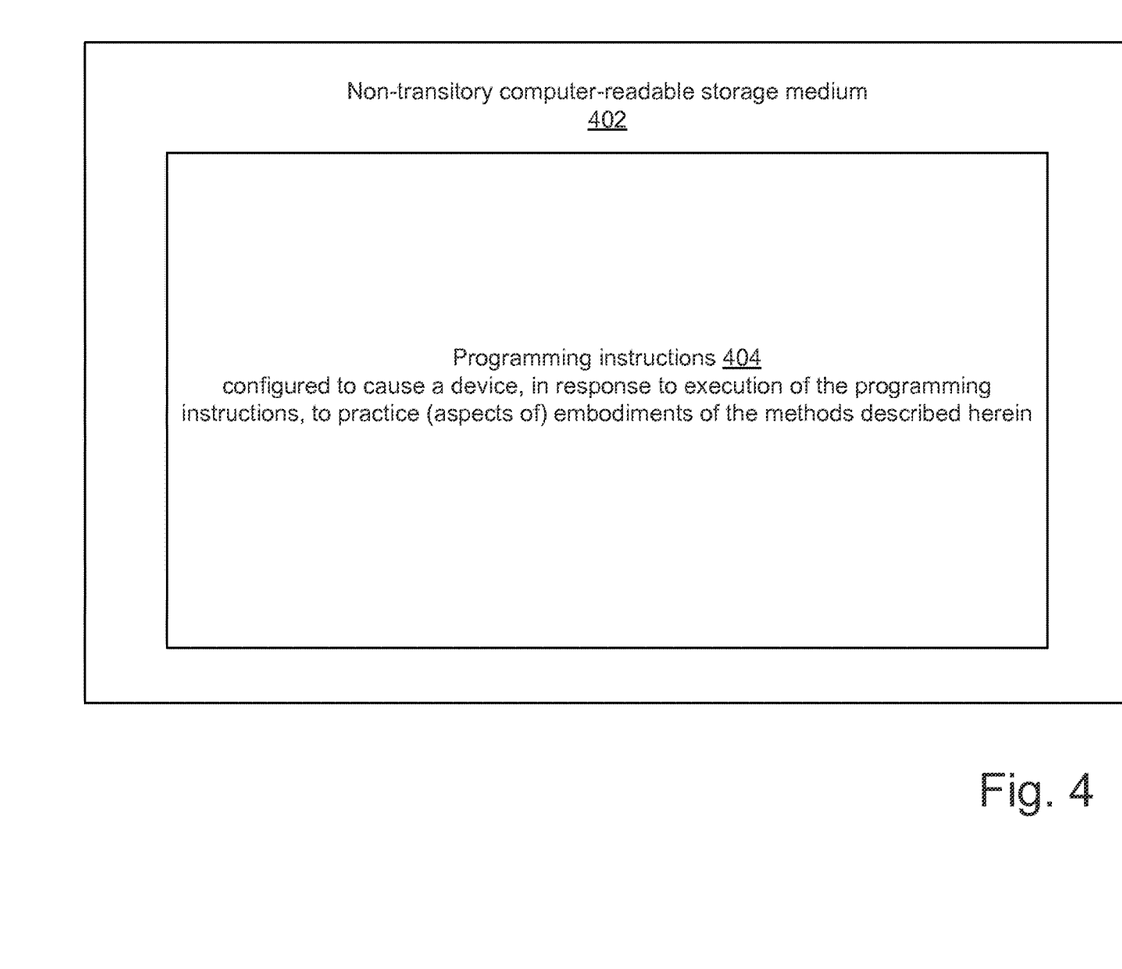
FIG. 4 illustrates an example storage medium with instructions configured to enable an apparatus to practice various aspects of the present disclosure, in accordance with various embodiments.

FIG. 4 illustrates an example at least one non-transitory computer-readable storage medium 402 having instructions configured to practice all or selected ones of the operations associated with the sensor device 102, earlier described, in accordance with various embodiments. As illustrated, at least one computer-readable storage medium 402 may include a number of programming instructions 404. The storage medium 402 may represent a broad range of persistent storage medium known in the art, including but not limited to flash memory, dynamic random access memory, static random access memory, an optical disk, a magnetic disk, etc. Programming instructions 404 may be configured to enable a device, e.g., computer 300 (in particular, sensor hub 309) or sensor device 102 in response to execution of the programming instructions 404, to perform, e.g., but not limited to, various operations described for sensor control module 130, other modules 132, power management module 172, MCU 174, and/or interrupt management module 176 shown and/or described with respect to FIG. 1, or operations shown and/or described with respect to process 200 of FIG. 2. In alternate embodiments, programming instructions 404 may be disposed on multiple computer-readable storage media 402. In alternate embodiments, storage medium 402 may be transitory, e.g., signals encoded with programming instructions 404.

Referring back to FIG. 3, for an embodiment, at least one of processors 302 may be packaged together with memory having computational logic 324 configured to practice aspects described for sensor control module 130, other modules 132, power management module 172, MCU 174, and/or interrupt management module 176 shown and/or described with respect to FIG. 1, or operations shown and/or described with respect to process 200 of FIG. 2. For an embodiment, at least one of processors 302 may be packaged together with memory having computational logic 324 configured to practice aspects described for sensor control module 130, other modules 132, power management module 172, MCU 174, and/or interrupt management module 176 shown and/or described with respect to FIG. 1, or operations shown and/or described with respect to process 200 of FIG. 2 to form a System in Package (SiP). For an embodiment, at least one of processors 302 may be integrated on the same die with memory having computational logic 324 configured to practice aspects described for sensor control module 130, other modules 132, power management module 172, MCU 174, and/or interrupt management module 176 shown and/or described with respect to FIG. 1, or operations shown and/or described with respect to process 200 of FIG. 2. For an embodiment, at least one of processors 302 may be packaged together with memory having computational logic 324 configured to practice aspects of sensor control module 130, other modules 132, power management module 172, MCU 174, and/or interrupt management module 176 shown and/or described with respect to FIG. 1, or operations shown or described with respect to process 200 of FIG. 2 to form a System on Chip (SoC). For at least one embodiment, the SoC may be utilized in, e.g., but not limited to, a mobile computing device such as a wearable device and/or a smartphone. In some embodiments, at least one of the processors 302 may correspond to the processor 104 of FIG. 1. In various embodiments, at least one of the processors 302 may be configured to cooperate with computational logic 324 to practice aspects of other components and/or modules of the sensor device 102.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a device for sensing, comprising: a processor; a sensor control module operated by the processor; a plurality of sensor connectors to removably receive a corresponding plurality of sensors, wherein each sensor connector includes a power terminal and a communication terminal; and a power management module coupled with the processor and the power terminals, wherein the power management module is to selectively provide power to the sensor connector power terminals in response to power management signals from the sensor control module.

Example 2 may include the subject matter of Example 1, further comprising an interrupt handling module, wherein: each sensor connector further includes an interrupt terminal; the interrupt handling module is coupled with the interrupt terminals; the interrupt handling module is to detect interrupt signals from the interrupt terminals; and the interrupt handling module is to determine which sensor connector is associated with a detected interrupt signal.

Example 3 may include the subject matter of any one of Examples 1-2, further comprising a multiplexer coupled with the processor and the communication terminals.

Example 4 may include the subject matter of Example 3, wherein the multiplexer is configured to selectively allow inter-integrated circuit (I2C) communication between the processor and each communication terminal.

Example 5 may include the subject matter of Example 4, further comprising: a serial peripheral interface (SPI) sensor connector that includes a power terminal and an SPI communication terminal, wherein the power terminal is coupled with the power management module; and an SPI to I2C conversion module coupled with the SPI communication terminal and the multiplexer.

Example 6 may include the subject matter of any one of Examples 1-5, wherein each sensor connector of the plurality of sensor connectors has a common form factor with a common physical dimensions as the other sensor connectors.

Example 7 may include the subject matter of any one of Examples 1-5, wherein a sensor address is associated with each sensor connector.

Example 8 may include the subject matter of Example 7, wherein the sensor address is a four bit address that corresponds with four upper bits of an I2C address.

Example 9 may include a computer implemented sensing method comprising: detecting, by a sensor device, whether a connection status of a first sensor connector of the sensor device, having a first sensor connector power terminal has changed from uncoupled with a sensor to coupled with a sensor in response to a sensor connecting to the first sensor connector; and receiving, by the sensor device, a sensor identifier from the sensor coupled with the first sensor connector in response to the first sensor connector detected to be changed from uncoupled with a sensor to coupled with a sensor.

Example 10 may include the subject matter of Example 9, further comprising: determining, by the sensor device, that the sensor coupled with the first sensor connector is redundant with another sensor coupled with a second sensor connector of the sensor device; ceasing, by the sensor device, to provide power to the first sensor connector power terminal; detecting, by the sensor device, whether a connection status of the second sensor connector has changed from coupled with a sensor to uncoupled with a sensor in response to a sensor disconnecting from the second sensor connector; and providing, by the sensing device, power to the first sensor connector power terminal in response to the second sensor connector detected to be changed from coupled with a sensor to uncoupled with a sensor.

Example 11 may include the subject matter of any one of Examples 9-10 further comprising: receiving, by the sensor device, an interrupt signal in response to the interrupt signal sent by a sensor coupled with one of a plurality of sensor connectors; and determining, by the sensor device, which sensor connector of the plurality of sensor connectors is associated with the interrupt signal.

Example 12 may include the subject matter of Example 11, further comprising reading, by the sensor device, data from the sensor coupled with the sensor connector determined to be associated with the interrupt signal in response to receiving the interrupt signal.

Example 13 may include the subject matter of any one of Examples 9-12, further comprising: determining, by the sensor device, that a first sensor coupled with the first sensor connector and a second sensor coupled with a second sensor connector having a second sensor connector power terminal are redundant sensors in response to the first sensor and the second sensor being the same type of sensor; and ceasing, by the sensor device, to provide power to the second sensor connector power terminal.

Example 14 may include the subject matter of Example 13, further comprising: determining, by the sensor device, that the first sensor is not providing accurate results; ceasing, by the sensor device, to provide power to the first sensor connector power terminal; and providing, by the sensor device, power to the second sensor connector power terminal.

Example 15 may include the subject matter of any one of Examples 9-14, further comprising: determining, by the sensor device, that the sensor coupled with the first sensor connector is not providing accurate results; and cycling, by the sensor device, power to the first sensor connector power terminal by ceasing to provide power to the first sensor connector power terminal for a first time period followed by providing power to the first sensor connector power terminal.

Example 16 may include at least one non-transitory computer-readable medium comprising instructions stored thereon that, in response to execution of the instructions by one or more processors of a sensor device, cause the sensor device to: detect whether a connection status of a first sensor connector having a first sensor connector power terminal has changed from uncoupled with a sensor to coupled with a sensor in response to a sensor connects to the first sensor connector; and receive a sensor identifier from the sensor coupled with the first sensor connector in response to the first sensor connector detected to be changed from uncoupled with a sensor to coupled with a sensor.

Example 17 may include the subject matter of Example 16, wherein the sensor device is further caused to: determine that the sensor coupled with the first sensor connector is redundant with another sensor coupled with a second sensor connector of the sensor device; cease to provide power to the first sensor connector power terminal; detect whether a connection status of the second sensor connector has changed from coupled with a sensor to uncoupled with a sensor in response to a sensor disconnects from the second sensor connector; and provide power to the first sensor connector power terminal in response to the second sensor connector detected to be changed from coupled with a sensor to uncoupled with a sensor.

Example 18 may include the subject matter of any one of Examples 16-17, wherein the sensor device is further caused to: receive an interrupt signal in response to the interrupt signal sent by a sensor coupled with one of a plurality of sensor connectors; and determine which sensor connector of the plurality of sensor connectors is associated with the interrupt signal.

Example 19 may include the subject matter of Example 18, wherein the sensor device is further caused to read data from the sensor coupled with the sensor connector determined to be associated with the interrupt signal in response to receipt of the interrupt signal.

Example 20 may include the subject matter of any one of Examples 16-19, wherein the sensor device is further caused to: determine that a first sensor coupled with the first sensor connector and a second sensor coupled with a second sensor connector having a second sensor connector power terminal are redundant sensors in response to the first sensor and the second sensor are the same type of sensor; and cease to provide power to the second sensor connector power terminal.

Example 21 may include the subject matter of Example 20, wherein the sensor device is further caused to: determine that the first sensor is not providing accurate results in response to receipt of results outside a predetermined range from the first sensor; cease to provide power to the first sensor connector power terminal; and provide power to the second sensor connector power terminal.

Example 22 may include the subject matter of any one of Examples 16-21, wherein the sensor device is further caused to provide power to the first sensor connector power terminal based at least in part on the sensor identifier, a duty cycle profile, or a power management profile.

Example 23 may include the subject matter of any one of Examples 16-22, wherein the sensor device is further caused to: determine a sensor reading time period associated with the sensor coupled with the first sensor connector; cease to provide power to the first sensor connector power terminal at times outside the sensor reading time period; and provide power to the first sensor connector power terminal during the sensor reading time period.

Example 24 may include the subject matter of any one of Examples 16-22, wherein the sensor device is further caused to determine a type of the sensor coupled with the first sensor connector based at least in part on the sensor identifier.

Example 25 may include the subject matter of any one of Examples 16-22, wherein the sensor is a first sensor and the sensor device is further caused to: detect whether a connection status of a second sensor connector having a second sensor connector power terminal has changed in response to a second sensor connects to the second sensor connector or disconnects from the second sensor connector; and maintain operation of the first sensor connector coupled with the first sensor while the second sensor connects and/or disconnects from the second sensor connector.

Example 26 may include a device for sensing comprising: means for detecting whether a connection status of a first sensor connector having a first sensor connector power terminal has changed from uncoupled with a sensor to coupled with a sensor in response to a sensor connecting to the first sensor connector; and means for receiving a sensor identifier from the sensor coupled with the first sensor connector in response to the first sensor connector detected to be changed from uncoupled with a sensor to coupled with a sensor.

Example 27 may include the subject matter of Example 26, further comprising: means for determining that the sensor coupled with the first sensor connector is redundant with another sensor coupled with a second sensor connector; means for ceasing to provide power to the first sensor connector power terminal; means for detecting whether a connection status of the second sensor connector has changed from coupled with a sensor to uncoupled with a sensor in response to a sensor disconnecting from the second sensor connector; and means for providing power to the first sensor connector power terminal in response to the second sensor connector detected to be changed from coupled with a sensor to uncoupled with a sensor.

Example 28 may include the subject matter of any one of Examples 26-27 further comprising: means for receiving an interrupt signal in response to the interrupt signal sent by a sensor coupled with one of a plurality of sensor connectors; and means for determining which sensor connector of the plurality of sensor connectors is associated with the interrupt signal.

Example 29 may include the subject matter of Example 28, further comprising means for reading data from the sensor coupled with the sensor connector determined to be associated with the interrupt signal in response to receiving the interrupt signal.

Example 30 may include the subject matter of any one of Examples 26-29, further comprising: means for determining that a first sensor coupled with the first sensor connector and a second sensor coupled with a second sensor connector having a second sensor connector power terminal are redundant sensors in response to the first sensor and the second sensor being the same type of sensor; and means for ceasing to provide power to the second sensor connector power terminal.

Example 31 may include the subject matter of Example 30, further comprising: means for determining that the first sensor is not providing accurate results; means for ceasing to provide power to the first sensor connector power terminal; and means for providing power to the second sensor connector power terminal.

Example 32 may include the subject matter of any one of Examples 26-31, further comprising: means for determining that the sensor coupled with the first sensor connector is not providing accurate results; and means for cycling power to the first sensor connector power terminal by ceasing to provide power to the first sensor connector power terminal for a first time period followed by providing power to the first sensor connector power terminal.

Example 33 may include the subject matter of any one of Examples 26-32, further comprising means for providing power to the first sensor connector power terminal based at least in part on the sensor identifier, a duty cycle profile, or a power management profile.

Example 34 may include the subject matter of any one of Examples 26-33, further comprising: means for determining a sensor reading time period associated with the sensor coupled with the first sensor connector; means for ceasing to provide power to the first sensor connector power terminal at times outside the sensor reading time period; and means for providing power to the first sensor connector power terminal during the sensor reading time period.

Example 35 may include the subject matter of any one of Examples 26-33, further comprising: means for determining a type of the sensor based at least in part on the sensor identifier.

Example 36 may include the subject matter of any one of Examples 26-33, further comprising: means for detecting whether a connection status of a second sensor connector having a second sensor connector power terminal has changed in response to a second sensor connecting to the second sensor connector or disconnecting from the second sensor connector; and means for maintaining operation of the first sensor connector coupled with the first sensor while the second sensor connects and/or disconnects from the second sensor connector.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A device for sensing, comprising:
a processor;
a sensor control module operated by the processor;
a plurality of sensor connectors to removably receive a corresponding plurality of sensors, wherein each sensor connector includes a power terminal and a communication terminal; and
a power management module coupled with the processor and the power terminals,
wherein the power management module is to selectively provide power to the sensor connector power terminals in response to power management signals from the sensor control module based at least in part on individual profiles corresponding to individual sensors connected to the sensor connector power terminals, and
wherein a sensor address is associated with each sensor connector of the plurality of sensor connectors.

2. The device for sensing of claim 1, further comprising an interrupt handling module, wherein:
each sensor connector further includes an interrupt terminal;
the interrupt handling module is coupled with the interrupt terminals;
the interrupt handling module is to detect interrupt signals from the interrupt terminals; and
the interrupt handling module is to determine which sensor connector is associated with a detected interrupt signal.

3. The device for sensing of claim 2, further comprising a multiplexer coupled with the processor and the communication terminals.

4. The device for sensing of claim 3, wherein the multiplexer is configured to selectively allow inter-integrated circuit (I2C) communication between the processor and each communication terminal.

5. The device for sensing of claim 4, further comprising:
a serial peripheral interface (SPI) sensor connector that includes a power terminal and an SPI communication terminal, wherein the power terminal is coupled with the power management module; and
an SPI to I2C conversion module coupled with the SPI communication terminal and the multiplexer.

6. The device for sensing of claim 2, wherein each sensor connector of the plurality of sensor connectors has a common form factor with a common physical dimension as the other sensor connectors.

7. The device for sensing of claim 1, wherein the sensor address is a four bit address that corresponds with four upper bits of an I2C address.

8. A computer implemented sensing method comprising:
detecting, by a sensor device, whether a connection status of a first sensor connector of the sensor device, having a first sensor connector power terminal, has changed from uncoupled with a sensor to coupled with a sensor in response to a sensor connecting to the first sensor connector;
receiving, by the sensor device, a sensor identifier from the sensor coupled with the first sensor connector in response to the first sensor connector detected to be changed from uncoupled with a sensor to coupled with a sensor; and
performing, by the sensor device, one or more of a redundancy check or an accuracy check for the sensor coupled with the first sensor connector, wherein in response to an accuracy check is performed, the method further includes cycling, by the sensor device, power to the first sensor connector power terminal by ceasing to provide power to the first sensor connector power terminal for a first time period followed by providing power to the first sensor connector power terminal, in response to the sensor device determines that the sensor coupled with the first sensor connector is not providing accurate results.

9. The computer implemented sensing method of claim 8, further comprising:
determining, by the sensor device, that the sensor coupled with the first sensor connector is redundant with another sensor coupled with a second sensor connector of the sensor device;
ceasing, by the sensor device, to provide power to the first sensor connector power terminal;
detecting, by the sensor device, whether a connection status of the second sensor connector has changed from coupled with a sensor to uncoupled with a sensor in response to a sensor disconnecting from the second sensor connector; and
providing, by the sensing device, power to the first sensor connector power terminal in response to the second sensor connector detected to be changed from coupled with a sensor to uncoupled with a sensor.

10. The computer implemented sensing method of claim 8, further comprising:
receiving, by the sensor device, an interrupt signal in response to the interrupt signal sent by a sensor coupled with one of a plurality of sensor connectors; and
determining, by the sensor device, which sensor connector of the plurality of sensor connectors is associated with the interrupt signal.

11. The computer implemented sensing method of claim 10, further comprising reading, by the sensor device, data from the sensor coupled with the sensor connector determined to be associated with the interrupt signal in response to receiving the interrupt signal.

12. The computer implemented sensing method of claim 8, further comprising:
determining, by the sensor device, that a first sensor coupled with the first sensor connector and a second sensor coupled with a second sensor connector having a second sensor connector power terminal are redundant sensors in response to the first sensor and the second sensor being the same type of sensor; and
ceasing, by the sensor device, to provide power to the second sensor connector power terminal.

13. The computer implemented sensing method of claim 12, further comprising:
determining, by the sensor device, that the first sensor is not providing accurate results;
ceasing, by the sensor device, to provide power to the first sensor connector power terminal; and
providing, by the sensor device, power to the second sensor connector power terminal.

14. At least one non-transitory computer-readable medium comprising instructions stored thereon that, in response to execution of the instructions by one or more processors of a sensor device, cause the sensor device to:
detect whether a connection status of a first sensor connector having a first sensor connector power terminal has changed from uncoupled with a sensor to coupled with a sensor in response to a sensor connects to the first sensor connector;

receive a sensor identifier from the sensor coupled with the first sensor connector in response to the first sensor connector detected to be changed from uncoupled with a sensor to coupled with a sensor; and cease to provide power to the first sensor connector power terminal for a first time period followed by providing power to the first sensor connector power terminal when the sensor coupled with the first sensor connector is determined to be redundant with another sensor based on performance of a redundancy check for the sensor coupled with the first sensor connector.

15. The at least one non-transitory computer-readable medium of claim 14, wherein the sensor device is further caused to:

determine that the sensor coupled with the first sensor connector is redundant with another sensor coupled with a second sensor connector of the sensor device;

cease to provide power to the first sensor connector power terminal;

detect whether a connection status of the second sensor connector has changed from coupled with a sensor to uncoupled with a sensor in response to a sensor disconnects from the second sensor connector; and provide power to the first sensor connector power terminal in response to the second sensor connector detected to be changed from coupled with a sensor to uncoupled with a sensor.

16. The at least one non-transitory computer-readable medium of claim 14, wherein the sensor device is further caused to:

receive an interrupt signal in response to the interrupt signal sent by a sensor coupled with one of a plurality of sensor connectors; and determine which sensor connector of the plurality of sensor connectors is associated with the interrupt signal.

17. The at least one non-transitory computer-readable medium of claim 16, wherein the sensor device is further caused to read data from the sensor coupled with the sensor connector determined to be associated with the interrupt signal in response to receipt of the interrupt signal.

18. The at least one non-transitory computer-readable medium of claim 14, wherein the sensor device is further caused to:

determine that a first sensor coupled with the first sensor connector and a second sensor coupled with a second sensor connector having a second sensor connector power terminal are redundant sensors in response to the first sensor and the second sensor are the same type of sensor; and cease to provide power to the second sensor connector power terminal.

19. The at least one non-transitory computer-readable medium of claim 18, wherein the sensor device is further caused to:

determine that the first sensor is not providing accurate results in response to receipt of results outside a predetermined range from the first sensor;

cease to provide power to the first sensor connector power terminal; and provide power to the second sensor connector power terminal.

20. The at least one non-transitory computer-readable medium of claim 14, wherein the sensor device is further caused to provide power to the first sensor connector power terminal based at least in part on the sensor identifier, a duty cycle profile, or a power management profile.

21. The at least one non-transitory computer-readable medium of claim 14, wherein the sensor device is further caused to:

determine a sensor reading time period associated with the sensor coupled with the first sensor connector;

cease to provide power to the first sensor connector power terminal at times outside the sensor reading time period; and provide power to the first sensor connector power terminal during the sensor reading time period.

22. The at least one non-transitory computer-readable medium of claim 14, wherein the sensor device is further caused to determine a type of the sensor coupled with the first sensor connector based at least in part on the sensor identifier.

23. The at least one non-transitory computer-readable medium of claim 14, wherein the sensor is a first sensor and the sensor device is further caused to:

detect whether a connection status of a second sensor connector having a second sensor connector power terminal has changed in response to a second sensor connects to the second sensor connector or disconnects from the second sensor connector; and maintain operation of the first sensor connector coupled with the first sensor while the second sensor connects and/or disconnects from the second sensor connector.

* * * * *